(12) United States Patent
Ozeki et al.

(10) Patent No.: US 7,828,382 B2
(45) Date of Patent: Nov. 9, 2010

(54) VEHICLE SEAT HAVING AN OPERATION LEVER ARRANGEMENT STRUCTURE

(75) Inventors: Hideyuki Ozeki, Aichi-ken (JP); Hiromasa Hayakawa, Toyoake (JP); Keiichirou Inoue, Toyota (JP)

(73) Assignees: Toyota Boshoku Kabushiki Kaisha, Aichi (JP); Toyota Jidosha Kabushiki Kaisha, Aichi-Ken (JP)

( * ) Notice: Subject to any disclaimer, the term of this patent is extended or adjusted under 35 U.S.C. 154(b) by 277 days.

(21) Appl. No.: 11/915,933

(22) PCT Filed: Jun. 1, 2006

(86) PCT No.: PCT/JP2006/310992
§ 371 (c)(1),
(2), (4) Date: Apr. 14, 2008

(87) PCT Pub. No.: WO2006/132127
PCT Pub. Date: Dec. 14, 2006

(65) Prior Publication Data
US 2009/0051202 A1 Feb. 26, 2009

(30) Foreign Application Priority Data
Jun. 8, 2005 (JP) .............................. 2005-168499

(51) Int. Cl.
*B60N 2/20* (2006.01)
*B60N 2/04* (2006.01)
(52) U.S. Cl. .................................. 297/341; 297/378.12
(58) Field of Classification Search ............ 297/378.12, 297/378.1, 344.1, 341, 463.1; 16/110.1, 16/DIG. 30; 74/491
See application file for complete search history.

(56) References Cited
U.S. PATENT DOCUMENTS
4,900,088 A * 2/1990 Bechtle et al. .......... 297/378.12

(Continued)

FOREIGN PATENT DOCUMENTS
JP 57-107637 12/1955

(Continued)

OTHER PUBLICATIONS
English Language Abstract of JP 2005-022550.

(Continued)

*Primary Examiner*—Milton Nelson, Jr.
(74) *Attorney, Agent, or Firm*—Greenblum & Bernstein, P.L.C.

(57) ABSTRACT

The present invention relates to an operation lever arrangement structure of a vehicle seat. The seat is provided with a tilt down operation lever and a walk-in operation lever. These operation levers are disposed on a side surface portion of a shoulder portion of a seat back, so as to be in a condition in which the operation levers are laterally aligned with each other along a widthwise direction of the seat back, and are rotatably supported by a rotational shaft positioned parallel to a connection shaft so as to be rotated in the same direction as a rotating direction of the seat back. When the operation levers are rotated in a forwardly tilting direction of the seat back, the seat back can be tilted down forwardly. An end portion as an operating portion of the walk-in operation lever disposed on an inner side is shaped to have an extended portion that is extended to an upper surface position of the tilt down operation lever disposed on an outer side.

5 Claims, 7 Drawing Sheets

U.S. PATENT DOCUMENTS

| | | | |
|---|---|---|---|
| 5,597,206 A * | 1/1997 | Ainsworth et al. | 297/378.12 |
| 6,164,723 A * | 12/2000 | Ganot | 297/378.12 |
| 6,336,679 B1 * | 1/2002 | Smuk | 297/378.12 |
| 7,472,963 B2 * | 1/2009 | Jeong | 297/463.1 |

FOREIGN PATENT DOCUMENTS

| | | |
|---|---|---|
| JP | 51-011146 | 3/1976 |
| JP | 58-093531 | 6/1983 |
| JP | 7-052697 | 2/1995 |
| JP | 2002-360377 | 12/2002 |
| JP | 2005-022550 | 1/2005 |

OTHER PUBLICATIONS

English Language Abstract of JP 7-052697.
English Language Abstract of JP 2002-360377.

\* cited by examiner

VEHICLE SEAT HAVING AN OPERATION LEVER ARRANGEMENT STRUCTURE

TECHNICAL FIELD

The present invention relates to an operation lever arrangement structure in a vehicle seat. More specifically, the present invention relates to an operation lever arrangement structure of a vehicle seat, which seat is provided with a tilt down operation lever for performing an operation to place a seat back to a folded condition in which the seat back is folded down forwardly toward a seat cushion, and a walk-in operation lever for performing an operation to slide the entire seat to a retracted position at a front side of the vehicle while placing the seat back to a forwardly inclined condition in which the seat back is tilted down forwardly toward the seat cushion.

BACKGROUND ART

Conventionally, some of vehicle rear seats are provided with a tilt down mechanism that permits to place seat backs of the seats not in use to a folded condition in which the seat backs are folded down forwardly toward the seat cushions. Further, some of the vehicle rear seats are provided with a walk-in mechanism that permits the entire seats to slide to a retracted position at a front side of the vehicle while placing the seat backs to a forwardly inclined condition in which the seat backs are tilted down forwardly toward the seat cushions The former, i.e., the tilt-down mechanism, places the seat in the folded condition when, for example, the seat is not in use. As a result, a back surface of the seat back functions as a floor surface, thereby increasing a baggage space in a rear side of a vehicle. The latter, i.e., the walk-in mechanism, functions to increase passenger space when, for example, a passenger gets in and out of a seat that is positioned behind the rear seat via a door beside the rear seat.

In such cases, the seat is provided with a tilt down operation lever and a walk-in operation lever in order to operate the respective mechanisms. It is considered that the above-mentioned operation levers are preferably collectively positioned at a door-facing shoulder portion of the seat back. This is because when the operation levers are positioned as described above, it is possible to easily operate the tilt down mechanism and the walk-in mechanism from a door-facing side or from behind the seat.

An art with regard to the arrangement structure of the above-mentioned operation levers in the seat is disclosed, for example, in Japanese Laid-Open Patent Publication No. 7-52697. In this disclosure, a knob corresponding to the tilt down operation lever is positioned at a shoulder portion of a back surface (a surface facing backward of a vehicle) of the seat back. When the knob is lifted up so as to release a locked condition of the seat back, the seat back can be folded down forwardly toward a seat cushion, so as to be placed to a folded condition.

DISCLOSURE OF THE INVENTION

Problem to be Solved by the Invention

However, in the above-mentioned conventional art, i.e., in the art in which the knob as the tilt down operation lever is positioned at the shoulder portion of the back surface of the seat back, so as to be operated by lifting up the same, an operating direction of the knob is different from an operating direction (a moving direction) of the seat back. This results in a poor operability. Such a problem can also be entailed when a walk-in operation lever is positioned at the portion.

In order to increase the operability, for example, it is preferred that the tilt down operation lever or the walk-in operation lever are positioned such that the operating direction thereof is coincident with the operating direction of the seat back. In particular, each of the operation levers is supported by a shaft positioned parallel to a rotational shaft (a reclining shaft) of the seat back, so that each of the operation levers can be rotated about the shaft. As a result, the operation of each of the operation levers can be coincident with the operating direction of the seat back.

However, when such a structure is used, for example, it is difficult to collectively position the operation levers at a door-facing shoulder portion of the seat back. That is, first, each of the operation levers involves a rotating motion. Therefore, available positions of the operation levers are limited to positions in which the above-mentioned rotating operation is not hindered, e.g., a side portion or an upper surface of a shoulder portion of the seat back. Further, the operation levers must be positioned such that the rotating operations thereof do not interfere with each other. However, for example, when the operation levers are positioned on a side surface portion of the seat back so as to be vertically spaced apart from each other, one of the releasing levers is set at a position far from the shoulder portion, or an additional installation space is required. In addition, for example, when the operation levers are supported by a common shaft so as to be laterally positioned along a widthwise direction of the side portion of the seat back, one of the operation levers is hidden in inside (inside with respect to the widthwise direction of seat back) of the other of the operation levers. This may lead to a decreased operability.

The present invention has been made in order to solve the above-mentioned problem. It is an object of the present invention to enable the tilt down operation lever and the walk-in operation lever of a vehicle seat to be operated in a good operability even when these operation levers are collectively positioned at the side surface portion of the shoulder portion of the seat back.

Means for Solving the Problem

In order to achieve the above-mentioned object, an operation lever arrangement structure in a vehicle seat of the present invention has the following mechanism.

First, an operation lever arrangement structure of a vehicle seat corresponding to a first invention includes a tilt down operation lever and a walk-in operation lever. The seat has a seat cushion and a seat back that are rotatably connected to each other via a connection shaft. The tilt down operation lever functions to operate a tilt down mechanism that is capable of placing the seat back to a folded condition in which the seat back is forwardly tilted down toward the seat cushion. The walk-in operation lever functions to operate a walk-in mechanism that is capable of sliding the seat to a retracted position at a front side of the vehicle while the seat back is placed to a forwardly tilted condition in which the seat back is forwardly tilted down toward the seat cushion. The operation levers are disposed on a side surface portion of a shoulder portion of the seat back, so as to be in a condition in which the operation levers are laterally aligned with each other along a widthwise direction of the seat back. The operation levers are rotatably supported by a rotational shaft positioned parallel to the connection shaft so as to be rotated in the same direction as a rotating direction of the seat back. The operation levers are normally rotationally biased by a spring member so as to be maintained in the condition in which the operation levers are laterally aligned with each other, so that when the operation levers are rotated in a forwardly tilting direction of the seat back against a rotational biasing force of the spring member, the seat back can be tilted down forwardly. The operation lever that is disposed on an inner side with respect to the widthwise direction of the seat back or a side closer to the seat back has an end portion as an operating portion that is extended upwardly than the operation lever disposed on an outer side with respect to the widthwise direction.

According to the first invention, rotating operations of the operation levers do not interfere with each other. Further, when the operation levers are rotated in the forwardly tilting direction of the seat back, the respective mechanisms are actuated, the seat back is tilted down forwardly. Moreover, the operation levers can be easily operated from the side corresponding to the side surface portion of the shoulder portion of the seat back or from behind.

A second invention corresponds to the first invention, wherein the end portion as the operating portion of the operation lever disposed on the inner side with respect to the widthwise direction of the seat back is directed toward the operation lever disposed on the outer side, and is shaped to have an extended portion that is extended to an upper surface position of the operation lever disposed on the outer side.

According to the second invention, the operating portion of each of the operation levers is aligned with the side surface portion of the seat back.

A third invention corresponds to the first or second invention, wherein the extended portion of the operation lever disposed on the inner side with respect to the widthwise direction of the seat back is exposed to an upper surface portion of a shoulder portion of the seat back.

According to the third invention, the operating portion of the operation lever disposed on the inner side with respect to the widthwise direction of the seat back is exposed to a side corresponding to the upper surface portion of the shoulder portion of the seat back.

A fourth invention corresponds to any one of the first to third inventions, wherein the extended portion of the operation lever disposed on the inner side with respect to the widthwise direction of the seat back is inclined downwardly with respect to the upper surface portion of the operation lever disposed on the outer side.

According to the fourth invention, a seat belt which is drawn out via a shoulder portion of the passenger sitting on the seat can be prevented from easily entering into a gap formed between the operation lever disposed on the inner side and the operation lever disposed on the outer side.

A fifth invention corresponds to any one of the first to fourth inventions, wherein the operation lever disposed on the inner side with respect to the widthwise direction of the seat back corresponds to the walk-in operation lever, and wherein the operation lever disposed on the outer side is the tilt down operation lever.

According to the fifth invention, because the operating portion of the walk-in operation lever is positioned above the operating portion of the tilt down operation lever, the walk-in operation lever can be easily operated from behind the seat back.

Effects of the Invention

The present invention may have following effects caused by the above-mentioned aspects.

First, according to the first invention, even if the tilt down operation lever and the walk-in operation lever are collectively disposed on the side surface portion of the shoulder portion of the seat back, the rotating operations of these operation levers are not hindered, so that the rotational operations of the operating levers can be easily performed from the side corresponding to the side surface portion of the seat back or from behind the seat back. That is, the operability of the operation levers can be improved.

Further, according to the second invention, the operation lever disposed on the inner side with respect to the widthwise direction of the seat back can be further easily operated from the side corresponding to the side surface portion of the shoulder portion of the seat back.

Further, according to the third invention, the operation lever disposed on the inner side with respect to the widthwise direction of the seat back can be operated from the side corresponding to the side surface portion of the shoulder portion of the seat back. That is, the operability of the operation lever can be further improved.

Further, according to the fourth invention, the seat belt can be prevented from being caught in the gap formed between the operation levers, so that the operability of the operation levers can be further improved.

Further, according to the fifth invention, the operability of the operation levers can be still further improved.

Figure 1:
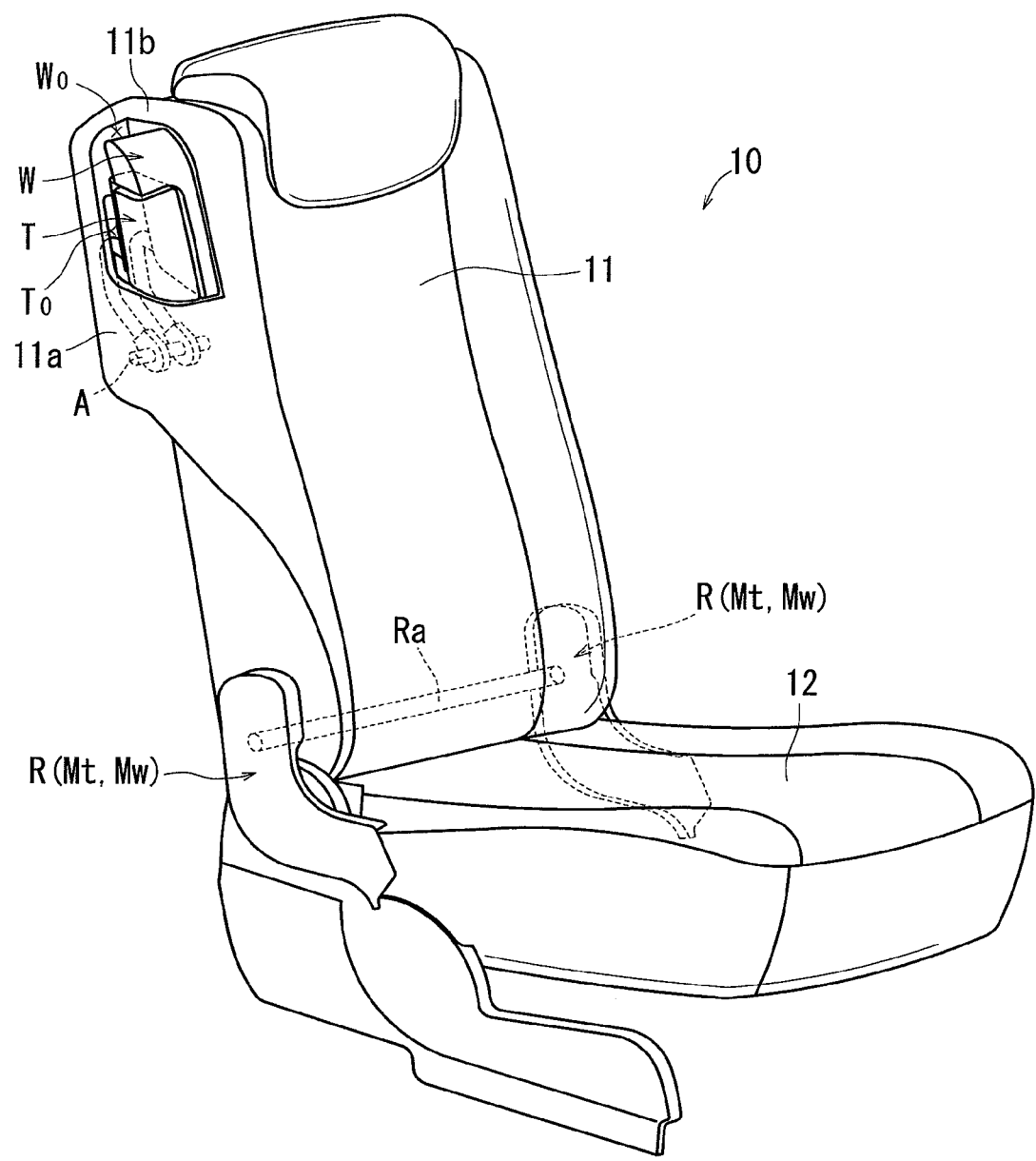
FIG. 1 is a perspective view schematically showing a structure of a vehicle seat according to a first embodiment.

DESCRIPTION OF REFERENCE SYMBOLS 10 seat
11 seat back
11a side surface portion
11b upper surface portion
12 seat cushion
20 seat back frame
21 slide surface
22 forward-tilting stopper surface
23 rearward-tilting stopper surface
30 seat cushion frame
31 support bracket
32 elongated hole
33 cable attachment portion 34 spring engagement portion
40 unlock link
50 stopper link
51 shaft
52 operation arm
53 actuation arm
54 stopper surface portion
60 spring member
70 unlock cable
80 unlock cable
81 stopper operation cable
A rotational shaft
R reclining device
Ra reclining shaft (connection shaft)
T tilt down operation lever
To opening
W walk-in operation lever
Wo opening
Mt tilt down mechanism
Mw walk-in mechanism

BEST MODE FOR CARRYING OUT THE INVENTION

An embodiment of the best mode for carrying out the present invention will be described hereinafter with reference to the drawings.

First Embodiment

First, an operation lever arrangement structure of a vehicle seat according to a first embodiment will be described with reference to FIGS. 1 to 9. Further, in FIGS. 4 to 9, a left-hand direction of the drawings corresponds to a forward direction of a vehicle.

A seat 10 according to this embodiment is used as a vehicle rear seat.

As best shown in FIG. 1, the seat 10 is provided with a pair of reclining devices R and R that rotatably connect a seat back 11 to a seat cushion 12. The reclining devices R and R are positioned at both sides with respect to a width wise direction of the seat 1 and between the seat back 11 and the seat cushion 12. Further, the reclining devices R and R are connected to a reclining shaft Ra that is positioned so as to extend therebetween. The reclining shaft Ra corresponds to a connection shaft of the present invention. Therefore, a motion of one R of the reclining devices can be transmitted to the other R of the reclining devices via the reclining shaft Ra, so that motions of the reclining devices can be synchronized with each other.

The reclining devices R and R are normally maintained in a locked condition in which a tilting motion of the seat back 11 with respect to the seat cushion 12 is restrained. As shown in FIG. 1, the seat 1 in use is maintained in a condition in which the seat back 11 is raised with respect to the seat cushion 12. Further, the reclining devices R and R can be switched to an unlocked condition in which the seat back 11 can be rotated around the reclining shaft Ra by operating or rotating a tilt down operation lever T and a walk-in operation lever W, which will be described hereinafter.

Figure 4:
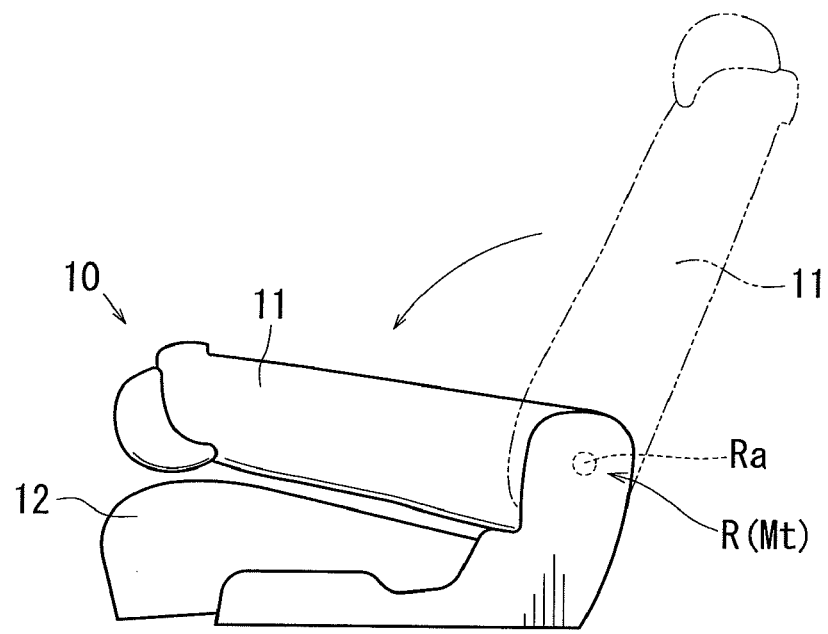
FIG. 4 is a side view of the seat that is in a folded condition.

Further, as best shown in FIG. 4, the seat 10 is provided with a tilt down mechanism Mt that can forwardly tilt down the seat back 11 onto the seat cushion 12 so as to switch the same to a folded condition when the seat is not in use. The tilt down mechanism Mt changes the seat 10 not in use to the folded condition shown in the drawing, so that a back surface of the seat back 11 can be functioned as a floor surface. Thus, a baggage space in a rear side of the vehicle can be enlarged.

Figure 5:
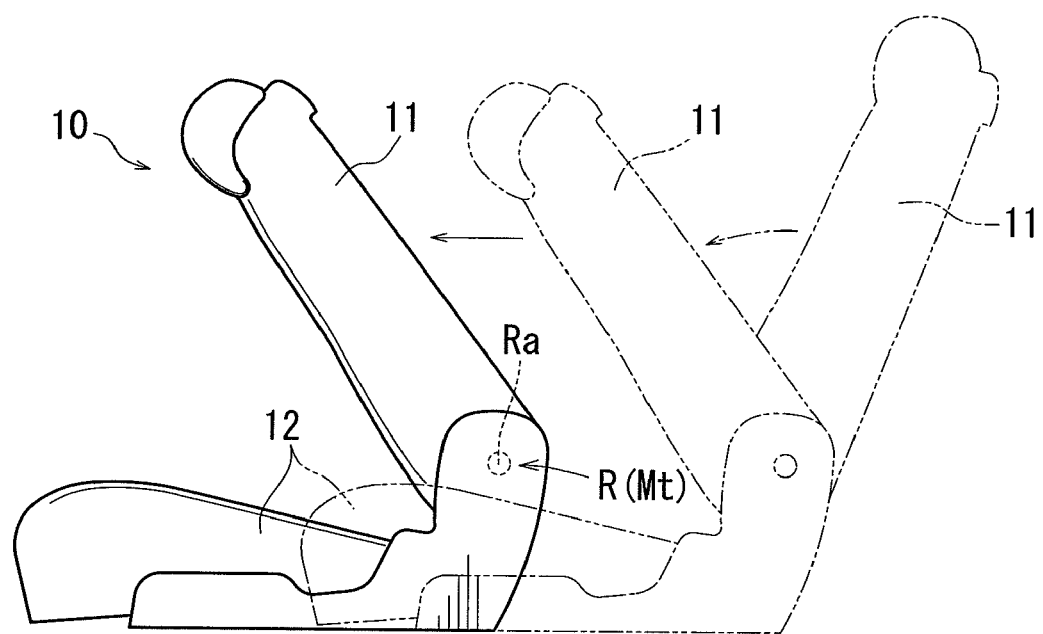
FIG. 5 is a side view showing a condition in which the seat is placed to a forwardly tilted condition and slid to a retracted position that is in a front side of a vehicle.

Further, as best shown in FIG. 5, the seat 10 is provided with a walk-in mechanism Mw that can change the seat back 11 to a condition in which the seat back 11 is forwardly tilted down toward the seat cushion 12, so that the entire seat 10 can be slid to a retracted position at a front side of the vehicle. The walk-in mechanism Mw can increase a passenger space when, for example, a passenger gets in and out of a seat (not shown) that is positioned behind the seat 10 via a door (not shown) beside the seat 10 (the rear seat).

Further, as best shown in FIG. 1, the seat 10 is provided with the tilt down operation lever T and the walk-in operation lever W for respectively operating the tilt down mechanism Mt and the walk-in mechanism Mw. The arrangement structure of the tilt down operation lever T and the walk-in operation lever W to the seat 10 will be described hereinafter in detail.

That is, as best shown in FIG. 1, the tilt down operation lever T and the walk-in operation lever W are collectively disposed on a side surface portion 11a of a shoulder portion of the seat back 11, more precisely, at an upper end of a door(not shown)-facing shoulder portion of the seat back 11. In particular, the tilt down operation lever T and the walk-in operation lever W are laterally disposed along the widthwise direction of the seat back 11, and are rotatably supported by a rotational shaft A positioned parallel to the reclining shaft Ra so as to be rotated in the same direction as a rotating direction of the seat back 11. That is, the operation levers are arranged such that their rotating operations do not interfere with each other. More precisely, the tilt down operation lever T is disposed on an outer side (a door-facing side) with respect to the widthwise direction of the seat back 11, and the walk-in operation lever W is disposed on an inner side (a side closer to the seat back 11) with respect to the widthwise direction of the seat back 11. Thus, a shaped portion configured to function as an operating portion of the tilt down operation lever T is aligned with the door(not shown)-facing side surface portion 11a of the seat back 11.

Further, as best shown in FIG. 1, the tilt down operation lever T and the walk-in operation lever W are shaped so as to be elongated radially outwardly from the rotational shaft A. Further, the walk-in operation lever W disposed on the inner side is shaped to have an extended portion that is extended to an upper surface position of the operation lever T disposed on the outer side. Further, the extended portion of the walk-in operation lever W is exposed to the upper surface portion 11b of the shoulder portion of the seat back 11. As a result, the extended portion constituting an operating portion of the walk-in operation lever W is aligned with the door(not shown)-facing side surface portion 11a and the upper surface portion 11b of the seat back 11. Further, the tilt down operation lever T, when is in a condition in which it is assembled to the seat back 11, has an opening To that is opened toward the side surface portion 11a corresponding to the outer side with respect to the widthwise direction of the seat back 11. Further, the walk-in operation lever W, when is in a condition in which it is assembled to the seat back 11, has an opening Wo that is opened toward the side surface portion 11a corresponding to the outer side with respect to the widthwise direction of the seat back 11 and toward the upper surface portion 11b of the seat back 11. With this construction, an operator can insert a hand or fingers into the openings To and Wo of the operation levers from the door(not shown)-facing side of the seat back 11 or from behind the seat 10, so as to easily perform operation.

Further, the extended portion of the walk-in operation lever W is formed to an inclined shape that is slightly inclined outwardly and downwardly with respect to the upper surface portion of the tilt down operation lever T. Further, in conformity with this, the tilt down operation lever T is also formed to an inclined shape that is slightly inclined inwardly and upwardly, so as to form a constant gap formed between the lever and the walk-in operation lever W. Thus, for example, a seat belt which is drawn out via a shoulder portion of the passenger sitting on the seat 10 can be prevented from easily entering into the gap formed between these operation levers. Further, in FIGS. 1 to 3, the inclined shapes are exaggerated for easy understanding of the above-mentioned shapes.

Figure 2:
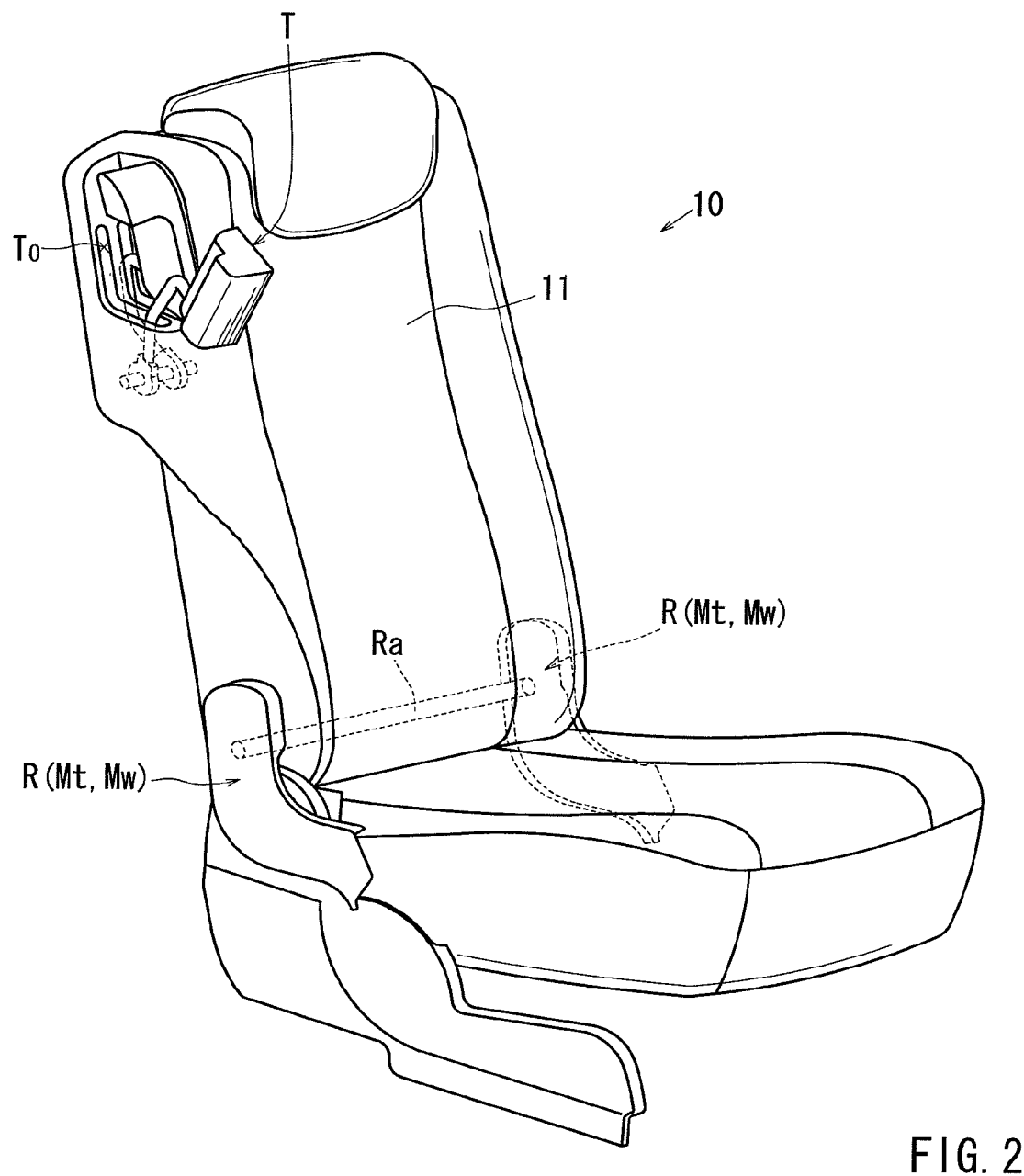
FIG. 2 is a perspective view showing a condition in which a tilt down operation lever is rotated.
Figure 3:
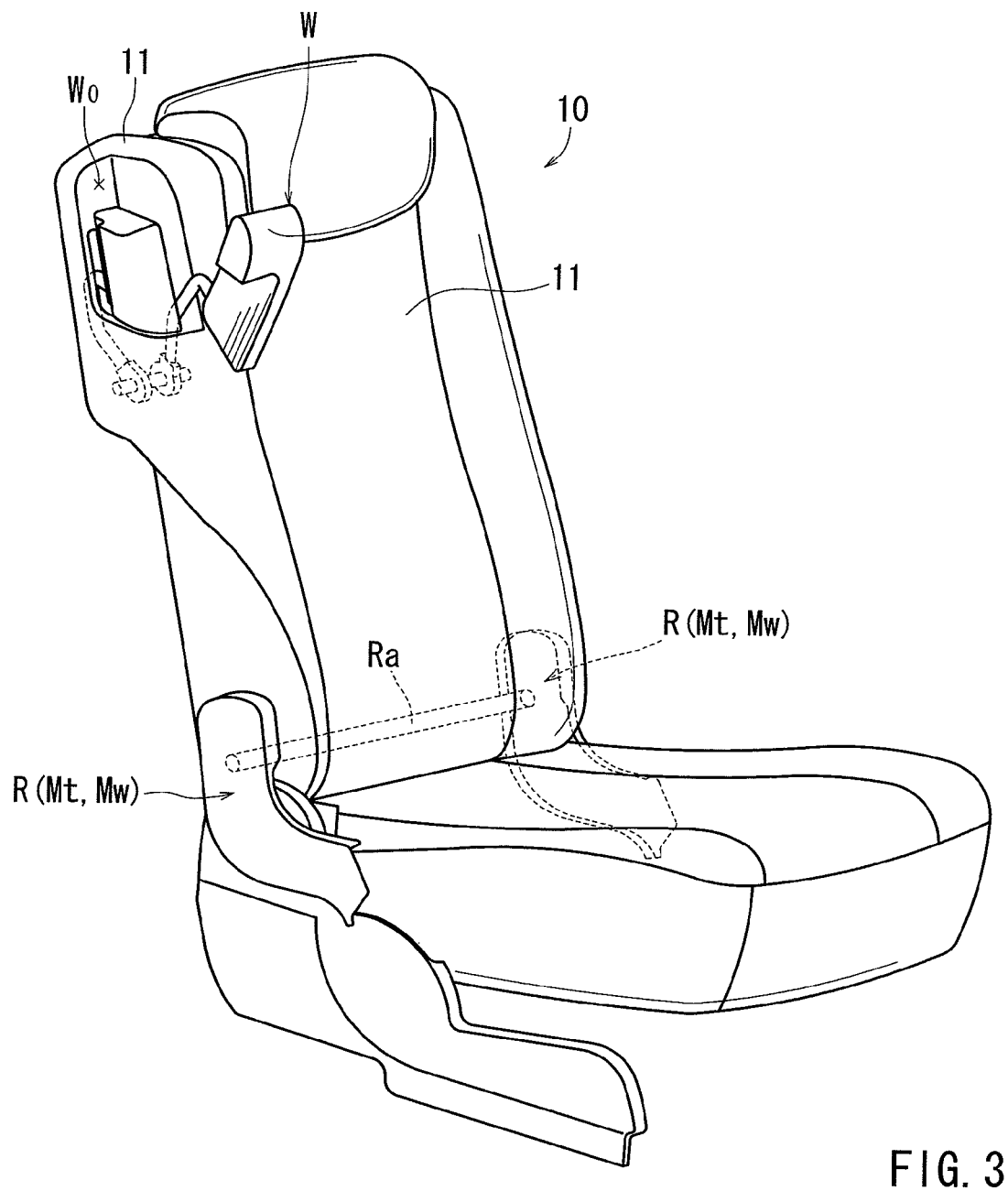
FIG. 3 is a perspective view showing a condition in which a walk-in operation lever is rotated.

The tilt down operation lever T and the walk-in operation lever W are normally rotationally biased by a spring member (not shown) so as to be maintained in a condition in which they are laterally aligned with each other as shown in FIG. 1. Therefore, as best shown in FIG. 2, when the tilt down operation lever T disposed on the outer side is rotated in the forwardly tilting direction of the seat back 11 against a rotational biasing force, the seat back 11 can be changed to a condition in which it is capable of rotating, so as to be folded down forwardly. Further, as best shown in FIG. 3, when the walk-in operation lever W disposed on the inner side is rotated in the forwardly tilting direction of the seat back 11 against the rotational biasing force, the seat back 11 can be changed to the condition in which it is capable of rotating, so as to be tilted down forwardly. The construction of the tilt down mechanism Mt and the walk-in mechanism Mw will be described hereinafter in detail.

Figure 6:
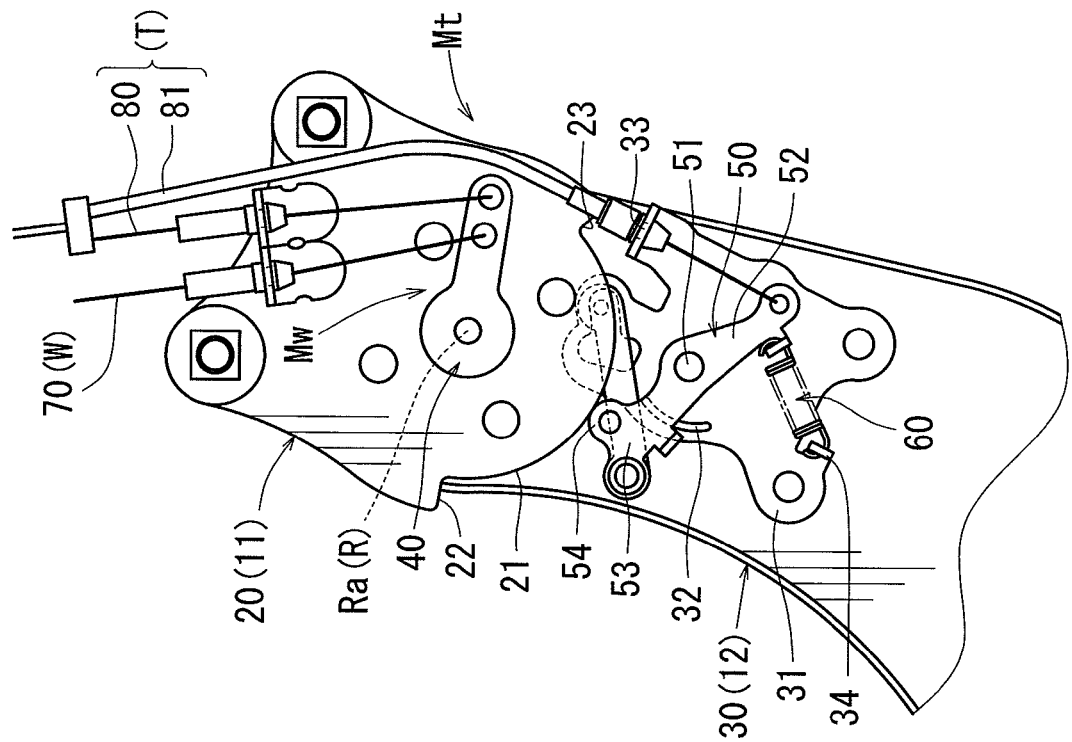
FIG. 6 is a side view illustrating a structure of a tilt-down mechanism and a walk-in mechanism.

That is, as best shown in FIG. 6, the tilt down mechanism Mt and the walk-in mechanism Mw are disposed between a seat back frame 20 constituting a frame of the seat back 11 and a seat cushion frame 30 constituting a frame of the seat cushion 12. Further, the tilt down mechanism Mt and the walk-in mechanism Mw, when operated by the tilt down operation lever T and the walk-in operation lever W, respectively switch an operation condition of the reclining devices R, thereby switching the seat back 11 from a condition in which the seat back 11 cannot be tilted to a condition in which the seat back 11 can be tilted.

In particular, the tilt down mechanism Mt and the walk-in mechanism Mw have an unlock link 40 that switches the seat back 11 between the condition in which the seat back 11 can be tilted and the condition in which the seat back 11 cannot be tilted, and a stopper link 50 that can engage the seat back frame 20 so as to restrain the tilting. The former, i.e., the unlock link 40 is rotatably attached to the seat back frame 20, and is connected to unlock cables 70 and 80. The latter, i.e., the stopper link 50 is rotatably attached to the seat cushion frame 30, and is connected to a stopper operation cable 81.

Further, the unlock cable 70 is connected to the walk-in operation lever W, so as to rotates the unlock link 40 when the walk-in operation lever W is rotated. Further, the unlock cable 80 and the stopper operation cable 81 are connected to the tilt down operation lever T, so as to simultaneously rotate the unlock link 40 and the stopper link 50 when the tilt down operation lever T is rotated.

The above-mentioned components will be described hereinafter in more detail.

Figure 9:
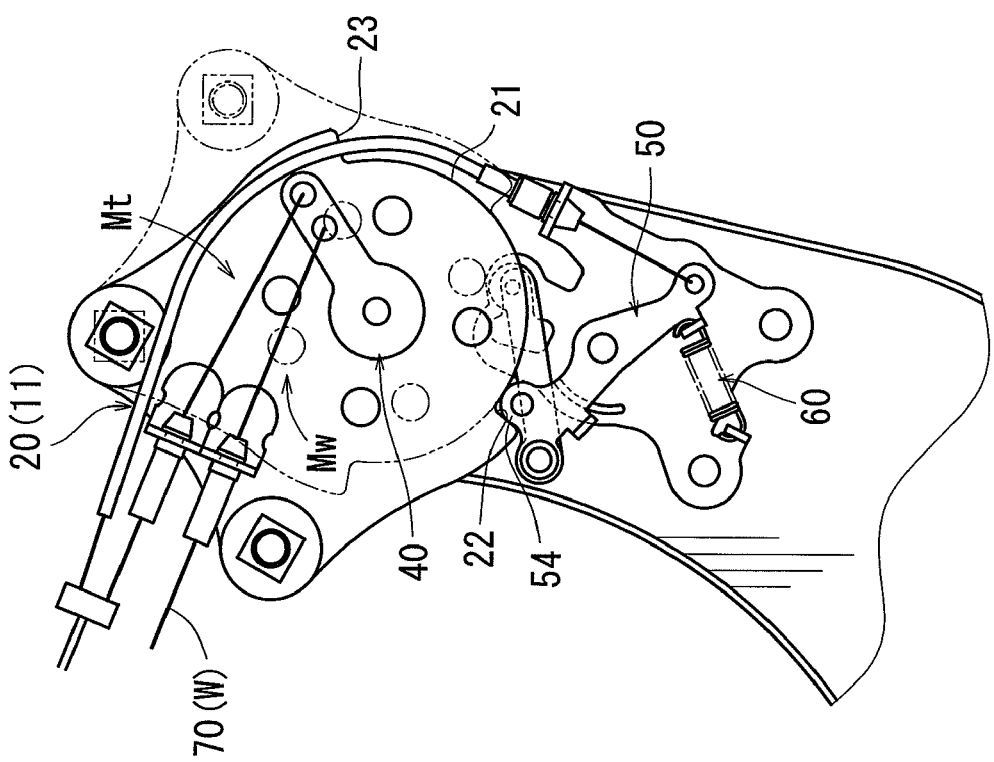
FIG. 9 is a side view showing a condition in which the walk-in operation lever is rotated from a position shown in FIG. 6, so that the seat back is tilted down forwardly so as to be placed to a forwardly inclined condition.

First, as best shown in FIG. 6, a lower end of the seat back frame 20 is formed with a smooth and arcuate slide surface 21. Further, both ends of the arcuate shape are respectively formed a forward-tilting stopper surface 22 and a rearward-tilting stopper surface 23 that are raised from the slide surface 21. More precisely, the slide surface 21 may function such that a stopper surface portion 54 of the stopper link 50, which will be described hereinafter, may slidably contact the arcuate shape thereof. Further, as best shown in FIG. 9, the forward-tilting stopper surface 22 and the rearward-tilting stopper surface 23 may function to engage the stopper surface portion 54 sliding on the slide surface 21, so as to limit the tilting of the seat back 11. The forward-tilting stopper surface 22 is positioned so as to engage the stopper surface portion 54 when a forward-tilting angle of the seat back 11 corresponds to a forward tilting posture (see FIG. 5) described below.

Next, as best shown in FIG. 6, the seat cushion frame 30 is integrally provided with a support bracket 31 which relatively rotatably supports the stopper link 50. The support bracket 31 has an elongated hole 32 that can engage the stopper link 50 so as to restrict a rotation range of the stopper link 50. Further, the support bracket 31 has a cable attachment portion 33 to which the stopper operation cable 81 is fixedly connected. In addition, the support bracket 31 has a spring engagement portion 34 to which one end of a spring member 60, which will be described below, is attached.

Next, as best shown in FIG. 6, the unlock link 40 is connected to the reclining shaft Ra that connects the reclining devices R and R. The unlock link 40 is normally rotationally biased by a biasing member (not shown), so as to be maintained in a lock condition (a condition shown in FIG. 6) in which the seat back 11 cannot be tilted. Further, when the unlock cable 70 or the unlock cable 80 is pulled by rotating the tilt down operation lever T or the walk-in operation lever W (see FIGS. 2 and 3), the unlock link 40 can be rotated counterclockwise in the drawing against the above-mentioned rotational biasing force. Thus, as best shown in FIGS. 7 and 9, it can be switched to an unlock condition in which the seat back 11 can be tilted.

Next, as best shown in FIG. 6, the stopper link 50 is rotatably connected to the support bracket 31 via a shaft 51. The stopper link 50 has an operation arm 52 constituting a right-hand arm portion shown in this drawing, which arm is connected to the stopper operation cable 81. Further, an actuation arm 53 constituting a left-hand arm portion is formed with the stopper surface portion 54.

Next, one end of the spring member 60 is attached to the spring engagement portion 34 of the support bracket 31, and the other end thereof engages the operation arm 52 of the stopper link 50. Thus, the stopper surface portion 54 of the stopper link 50 is rotationally biased so as to contact the slide surface 21 of the seat back frame 20.

Figure 7:
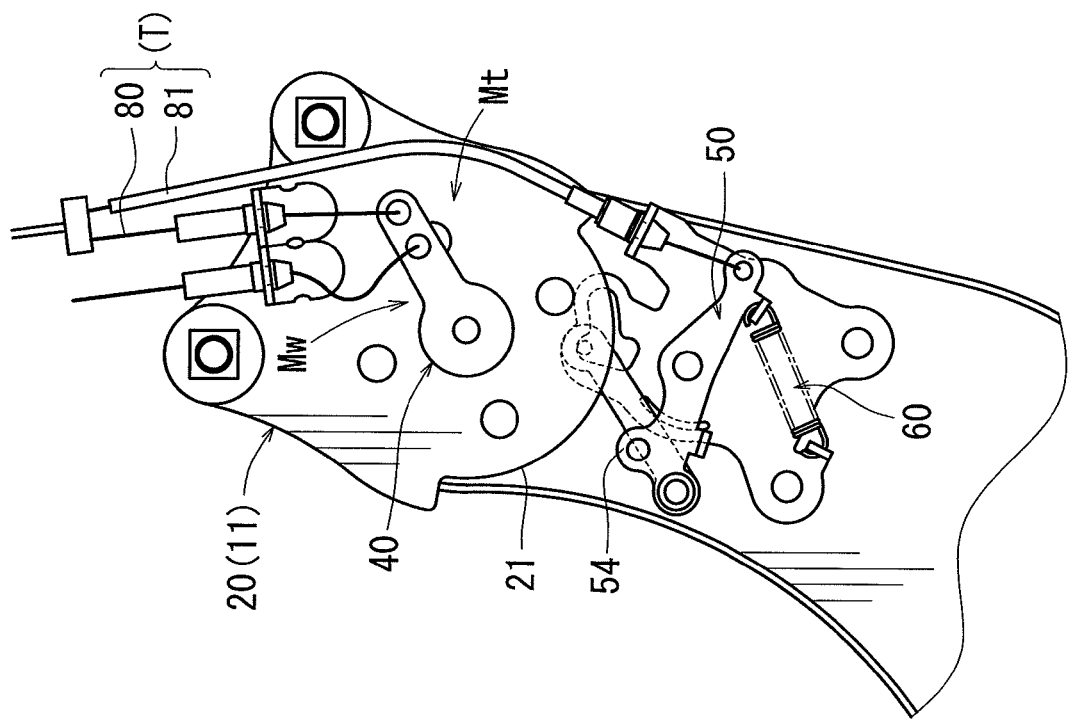
FIG. 7 is a side view showing a condition in which the tilt down operation lever is rotated from a position shown in FIG. 6.
Figure 8:
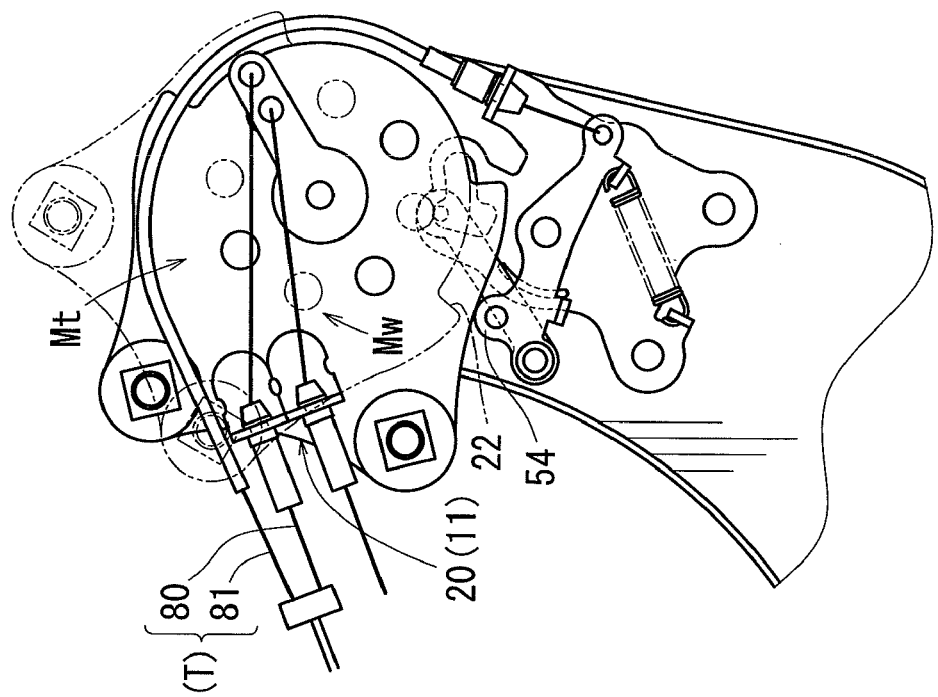
FIG. 8 is a side view showing a condition in which a seat back is forwardly tilted down from a position shown in FIG. 7 so as to be placed to the folded condition.

Therefore, as best shown in FIG. 7, when the tilt down operation lever T is rotationally operated, both of the unlock cable 80 and the stopper operation cable 81 are pulled, so that the unlock link 40 and the stopper link 50 are rotated counterclockwise in the drawing. Thus, the unlock link 40 is switched to the unlock condition in which the seat back 11 can be tilted. Further, the stopper link 50 is maintained against the biasing force of the spring member 60, so that the stopper surface portion 54 can be spaced away from the slide surface 21. Therefore, as best shown in FIG. 8, when the seat back 11 is tilted forwardly while the tilt down operation lever T is rotated, the seat back 11 can be changed to the folded condition shown in FIG. 4 without engaging the stopper surface portion 54 with the forward-tilting stopper surface 22 (see a condition shown by a phantom line).

Further, as best shown in FIG. 9, when the walk-in operation lever W is rotationally operated, the unlock cable 70 is exclusively pulled, so that the unlock link 40 is exclusively rotated counterclockwise in the drawing. Thus, the unlock link 40 is switched to the unlock condition in which the seat back 11 can be tilted. At this time, the stopper link 50 is maintained by the biasing force of the spring member 60, so that the stopper surface portion 54 is in contact with the slide surface 21. Therefore, when the seat back 11 is tilted forwardly while the walk-in operation lever W is rotated, the seat back 11 can be changed to a forwardly tilted condition in which the stopper surface portion 54 engages the forward-tilting stopper surface 22. Further, the walk-in operation lever W is also connected to a slide mechanism (not shown), so that when the walk-in operation lever W is rotationally operated, the seat 10 can be switched to a condition in which the seat 10 can slide in a longitudinal direction of the vehicle. Therefore, as best shown in FIG. 5, the seat 10 in the forwardly tilted condition can be slid to a retracted position at the front side of the vehicle.

Next, a method of using this embodiment will be described.

Further, as best shown in FIG. 1, the seat 10 is in a condition in which the seat back 11 is raised for use.

First, in order to tilt down the seat 10 in this condition to the folded condition, the tilt down operation lever T is rotated. More precisely, as best shown in FIG. 2, the tilt down operation lever T is rotated in the same direction as the forwardly tilting direction of the seat back 11. At this time, the operator can easily perform the rotating operation of the tilt down operation lever T by inserting the hand or the fingers into the openings To of the tilt down operation lever T from the door (not shown)-facing side or from behind the seat 10. Thus, the seat back 11 is switched to the condition in which the seat back 11 can be tilted, so that the seat back 11 can be changed to the folded condition in which the seat back 11 is forwardly folded down toward the seat cushion 12, as best shown in FIG. 4.

Alternatively, in order to change the seat 10 in the condition shown in FIG. 1 to the forwardly tilted condition and to slide the same to the retracted position at the front side of the vehicle, the walk-in operation lever W is rotated. More precisely, as best shown in FIG. 3, the walk-in operation lever W is rotated in the same direction as the forwardly tilting direction of the seat back 11. At this time, the operator can easily perform the rotating operation of the walk-in operation lever W by inserting the hand or the fingers into the openings Wo of the walk-in operation lever W from the door(not shown)-facing side or from behind the seat 10. Further, the walk-in operation lever W is disposed so as to be exposed to the upper surface portion 11b of the seat back 11. Therefore, when the operation is, for example, performed from behind the seat 10, the operation can be easily performed by inserting the hand or the fingers from the side corresponding to the upper surface portion 11b. Thus, the seat back 11 is switched to the condition in which the seat back 11 can be tilted, so that the seat back 11 can be changed to the forwardly tilted condition in which the seat back 11 has been forwardly tilted down toward the seat cushion 12, as best shown in FIG. 5. Thereafter, by sliding the seat 10 as it is toward the front side of the vehicle, the space formed between the seat 10 and the seat (not shown) that is positioned behind the seat 10 can be increased.

Further, the extended portion of the walk-in operation lever W is formed to the inclined shape that is inclined outwardly and downwardly. Therefore, for example, the seat belt can be prevented from easily entering into the gap formed between the tilt down and walk-in operation levers, so as to be prevented from being caught in the gap As described above, according to the operation lever arrangement structure of the vehicle seat in this embodiment, even if the tilt down operation lever T and the walk-in operation lever W are collectively disposed on the side surface portion 11a of the shoulder portion of the seat back 11, the rotating operations of these operation levers are not hindered, so that the rotational operations of the operating levers can be easily performed from the side (the door-facing side) corresponding to the side surface portion 11a of the seat back 11 or from behind the seat back. That is, the operability of the operation levers can be improved. Further, because the walk-in operation lever W disposed on the inner side with respect to the widthwise direction of the seat back 11 is exposed to the side corresponding to the upper surface portion 11b of the shoulder portion of the seat back 11, the lever can be operated from the upper surface portion 11b. That is, the operability of the operation levers can be further improved. Moreover, for example, the seat belt can be prevented from being caught in the gap formed between the operation levers, so that the operability of the operation levers can be further improved. Further, because the walk-in operation lever W is disposed on the inner side, the seat 10 can be easily operated from behind the seat 10, so that the operability of the operation levers can be further improved.

Although the present invention is described with reference to one embodiment, the present invention can be carried out in various embodiments in addition to the embodiment described above.

For example, the positions of the tilt down operation lever and the walk-in operation lever are interchangeable. In this case, the tilt down operation lever can be easily operated from the side corresponding to the upper surface of the seat back.

Further, the operation lever corresponding to "an operation lever disposed on an inner side" does not necessary have to be inclined downwardly with respect to the upper surface portion of an operation lever disposed on an outer side. However, in this case, it is preferred to separately provide a means, so as to prevent the seat belt from entering into the gap between the operation levers. For example, an outer edge portion of the operation lever disposed on the outer side can be shaped so as to project toward the extended portion of the upper operation lever.

Figure 10:
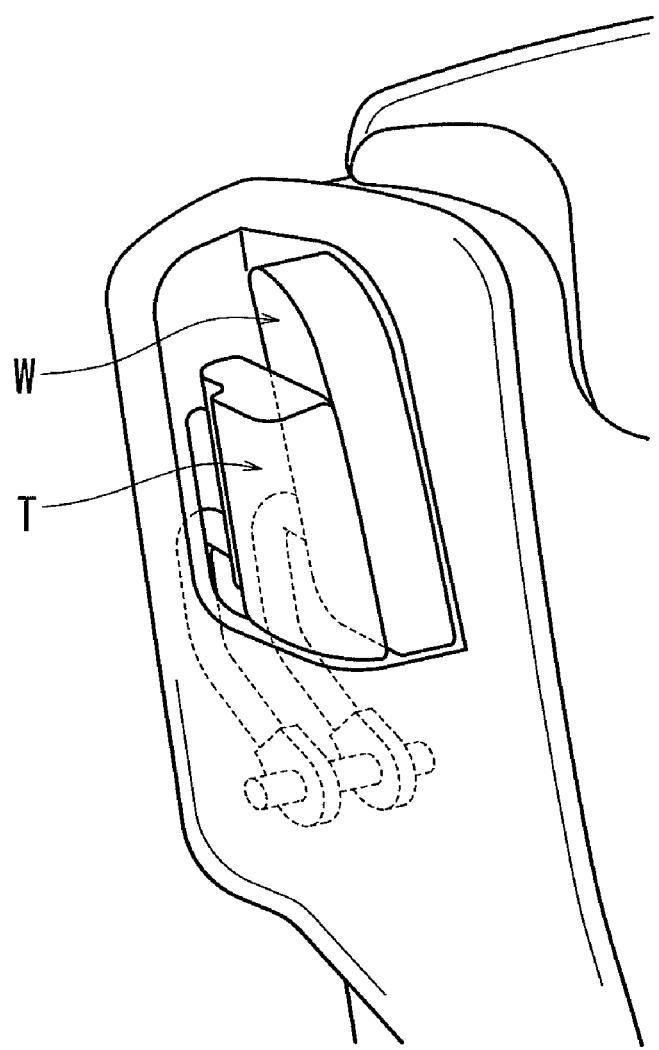
FIG. 10 is a perspective view showing an operation lever arrangement structure in another embodiment.

Further, as best shown in FIG. 10, the operation lever W disposed on the inner side can simply extend upwardly beyond the operation lever T disposed on the outer side. That is, the operation lever W is not necessary be formed with the extended portion that is extended to the upper surface position of the operation lever T disposed on the outer side. In this case, in comparison with the construction of the above-mentioned embodiment, the inner operation lever W is not easily operated from the side corresponding to the side surface portion of the shoulder portion of the seat back. However, the inner operation lever W can be easily molded.

Further, the operation lever corresponding to "an operation lever disposed on an outer side" of the present invention does not necessary have to be exposed to the upper surface side of the seat back. However, in this case, it is noted that the operation lever is not easily operated from the side corresponding to the upper surface of the seat back.

The invention claimed is:

1. A vehicle seat having an operation lever arrangement structure comprising:
   a seat cushion and a seat back that are rotatably connected to each other via a connection shaft;
   a tilt down operation lever for operating a tilt down mechanism that is capable of placing the seat back to a folded condition in which the seat back is forwardly tilted down toward the seat cushion; and
   a walk-in operation lever for operating a walk-in mechanism that is capable of sliding the seat to a retracted position at a front side of the vehicle while the seat back is placed to a forwardly tilted condition in which the seat back is forwardly tilted down toward the seat cushion,
   wherein the tilt down operation lever and the walk-in operation lever are disposed on a side surface portion of a shoulder portion of the seat back, so as to be in a condition in which the operation levers are laterally aligned with each other along a widthwise direction of the seat back, and are rotatably supported by a rotational shaft positioned parallel to the connection shaft so as to be rotated in the same direction as a rotating direction of the seat back, wherein the operation levers are normally rotationally biased by a spring member so as to be maintained in the condition in which the operation levers are laterally aligned with each other, so that when the operation levers are rotated in a forwardly tilting direction of the seat back against a rotational biasing force of the spring member, the seat back can be forwardly tilted down, and wherein the operation lever that is disposed on an inner side with respect to the widthwise direction of the seat back has an end portion as an operating portion that extends upwardly beyond the operation lever disposed on an outer side with respect to the widthwise direction.

2. The vehicle seat as defined in claim 1, wherein the end portion as the operating portion of the operation lever disposed on the inner side with respect to the widthwise direction of the seat back is directed toward the operation lever disposed on the outer side, and is shaped to have an extended portion that is extended to an upper surface position of the operation lever disposed on the outer side.

3. The vehicle seat as defined in claim 2, wherein the extended portion of the operation lever disposed on the inner side with respect to the widthwise direction of the seat back is exposed to an upper surface portion of the shoulder portion of the seat back.

4. The vehicle seat as defined in claim 2, wherein the extended portion of the operation lever disposed on the inner side with respect to the widthwise direction of the seat back is inclined downwardly with respect to the upper surface portion of the operation lever disposed on the outer side.

5. The vehicle seat as defined in claim 1, wherein the operation lever disposed on the inner side with respect to the widthwise direction of the seat back corresponds to the walk-in operation lever, and wherein the operation lever disposed on the outer side is the tilt down operation lever.

* * * * *

UNITED STATES PATENT AND TRADEMARK OFFICE
CERTIFICATE OF CORRECTION

| | | |
|---|---|---|
| PATENT NO. | : 7,828,382 B2 | Page 1 of 1 |
| APPLICATION NO. | : 11/915933 | |
| DATED | : November 9, 2010 | |
| INVENTOR(S) | : H. Ozeki et al. | |

It is certified that error appears in the above-identified patent and that said Letters Patent is hereby corrected as shown below:

On Cover page (75), Inventors, "Hayakawa, Toyoake (JP)" should be --Hayakawa, Aichi-ken (JP)--.

On Cover page (75), Inventors, "Inoue, Toyota (JP)" should be --Inoue, Aichi-ken (JP)--.

Signed and Sealed this

Seventeenth Day of May, 2011

David J. Kappos
*Director of the United States Patent and Trademark Office*